United States Patent
Pushkin et al.

(10) Patent No.: US 12,061,956 B1
(45) Date of Patent: Aug. 13, 2024

(54) FEDERATED LEARNING SERVICE IN A PROVIDER NETWORK AND TRAINING MACHINE LEARNING MODELS USING DEVICES EXTERNAL TO THE PROVIDER NETWORK

(71) Applicant: Amazon Technologies, Inc., Seattle, WA (US)

(72) Inventors: Yahor Pushkin, Redmond, WA (US); Sunil Mallya Kasaragod, San Francisco, CA (US); Sravan Babu Bodapati, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 989 days.

(21) Appl. No.: 17/037,114

(22) Filed: Sep. 29, 2020

(51) Int. Cl.
*G06N 20/00* (2019.01)
*G06F 11/36* (2006.01)

(52) U.S. Cl.
CPC ........ *G06N 20/00* (2019.01); *G06F 11/3688* (2013.01); *G06F 11/3692* (2013.01)

(58) Field of Classification Search
None
See application file for complete search history.

(56) References Cited

U.S. PATENT DOCUMENTS

| | | | | |
|---|---|---|---|---|
| 10,402,723 | B1* | 9/2019 | Silberman | G06N 3/006 |
| 11,429,762 | B2* | 8/2022 | Mallya Kasaragod | G06F 30/20 |
| 11,580,458 | B2* | 2/2023 | Liu | G06F 16/22 |
| 2018/0293498 | A1* | 10/2018 | Campos | G06N 3/04 |
| 2018/0314564 | A1* | 11/2018 | Chilukuri | H04L 63/0815 |
| 2019/0026634 | A1* | 1/2019 | Homeyer | G06N 20/00 |
| 2019/0220755 | A1* | 7/2019 | Carbune | G06N 20/00 |
| 2019/0227980 | A1* | 7/2019 | McMahan | G06N 3/044 |
| 2019/0340534 | A1* | 11/2019 | McMahan | G06N 7/01 |
| 2020/0050951 | A1* | 2/2020 | Wang | G06N 20/00 |
| 2020/0167437 | A1* | 5/2020 | Mallya Kasaragod | G06F 30/27 |
| 2020/0364608 | A1* | 11/2020 | Anwar | G06N 20/00 |

(Continued)

OTHER PUBLICATIONS

J. Kang et al. "Reliable Federated Learning for Mobile Networks," in IEEE Wireless Communications, vol. 27, pp. 72-80, Apr. 2020.*

(Continued)

*Primary Examiner* — Maikhanh Nguyen
(74) *Attorney, Agent, or Firm* — Nicholson De Vos Webster & Elliott LLP

(57) ABSTRACT

Techniques for utilizing a federated learning service are described. An exemplary method includes causing a development of a deployable machine learning model using at least two devices, the development of the deployable machine learning model including: providing an initial machine learning model or algorithm to the at least two devices external to the provider network, causing each of the at least two devices external to the provider network to locally train the initial machine learning model or algorithm using training data to each generate a modified version of the initial machine learning model, determining updates between the initial model and the generated modified versions of the initial machine learning model, and applying the determined updates to the initial model to generate the candidate machine learning model.

20 Claims, 10 Drawing Sheets

(56) References Cited

U.S. PATENT DOCUMENTS

2022/0083906 A1\* 3/2022 Ong ..................... G06F 18/254

OTHER PUBLICATIONS

Li et al. "A Review of Applications in Federal Learning," Computers & Industrial Engineering, Sep. 2020, 15 pages.\*
Kairouz, Peter et al., Advances and Open Problems in Federated Learning, arXiv:1912.04977v3 (2021), 121 pgs., https://arxiv.org/pdf/1912.04977.pdf.

\* cited by examiner

FEDERATED LEARNING SERVICE IN A PROVIDER NETWORK AND TRAINING MACHINE LEARNING MODELS USING DEVICES EXTERNAL TO THE PROVIDER NETWORK

BACKGROUND

Federated learning is a machine learning (ML) approach where many clients (e.g., mobile devices or organizations) collaboratively train one or more models under the orchestration of a central entity (e.g., a service provider). Typically, the training data used in the training is decentralized.

BRIEF DESCRIPTION OF DRAWINGS

Various embodiments in accordance with the present disclosure will be described with reference to the drawings, in which.

DETAILED DESCRIPTION

The present disclosure relates to methods, apparatus, systems, and non-transitory computer-readable storage media for federated learning. According to some embodiments, a federating learning services allows for one or more of: remote training with local data, remote training with provided data, remote testing, and deployment of models. This service allows users to bootstrap and deploy scalable and secure federated learning workloads to their distributed ecosystems. The importance of edge model deployment and distributed data handling grows as machine learning technologies get integrated into consumer and enterprise applications running on remote devices. Additionally, a growing emphasis on privacy aspects of data handling necessitates the need for services allowing models to be deployed and even improved at the edge directly.

Figure 1:
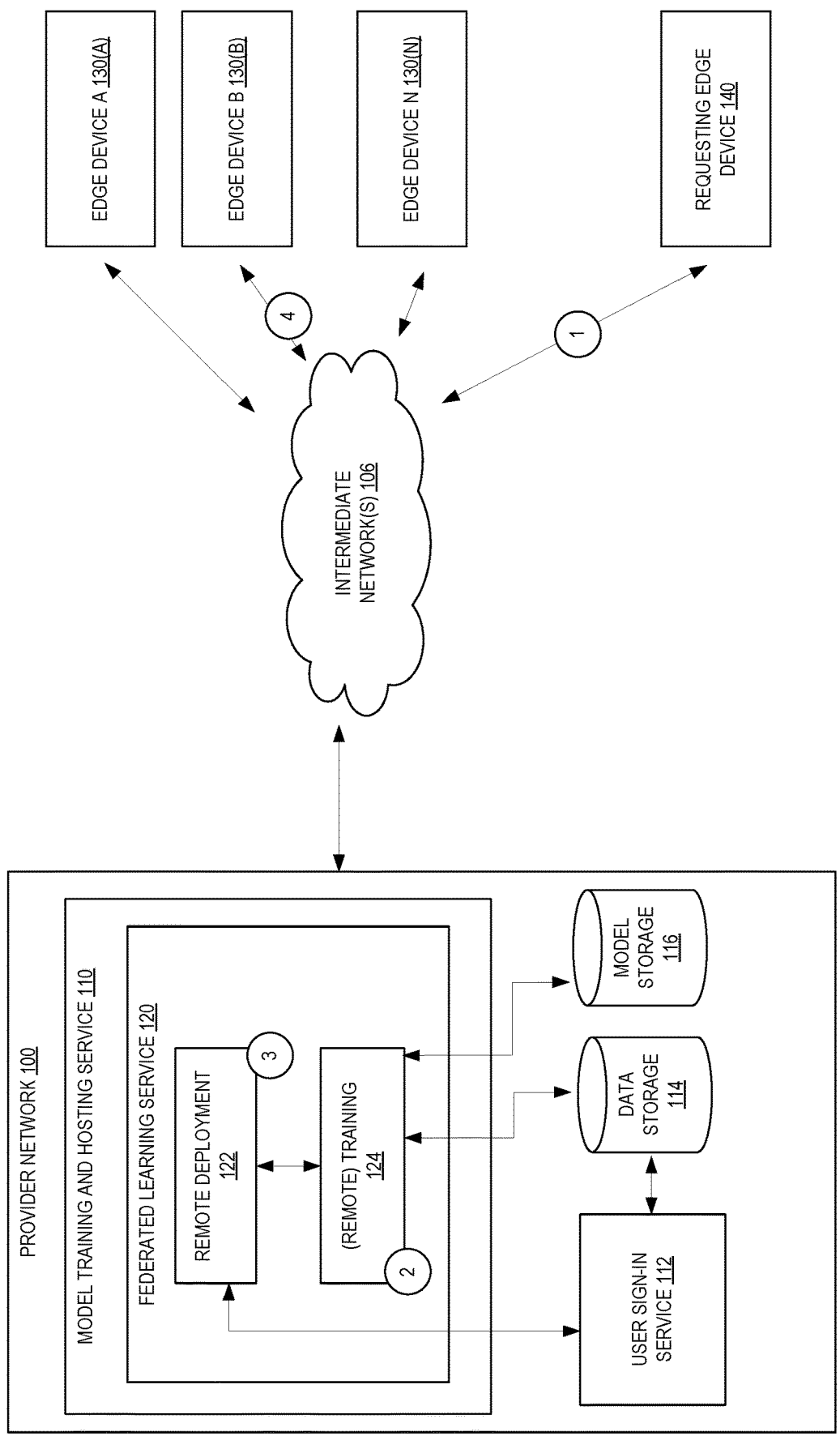
FIG. 1 illustrates embodiments of systems that support a federated learning service.

FIG. 1 illustrates embodiments of systems that support a federated learning service. As illustrated, a provider network 100 includes a model training and hosting service 110. This service 110 allows for a user provided ML model to be trained and then hosted by the provider network 100. The model training and hosting service 110 may provide several different ways of accomplishing this training and hosting, but the focus of this discussion is on the use of federated learning for at least the training aspect. In some embodiments, models are brought by users for their own training/deployment. In other embodiments, models are provided by third parties for training/deployment on a particular user's data. For example, a third party may have an image recognition model that is to be trained on the user's dataset instead of the user providing the model.

A federated learning service 120 allows for one or more of remote ML model management (such as deployment and removal) of one or more ML models on one or more edge devices 130(A)-(N) (such as mobile devices, cameras, IoT devices, points of service, etc.). In particular, a remote deployment service (or module) 122 provides for this ability. The ability to remove a model deployment focuses the remote deployment service 122 on managing a population of connected edge device (clients). The is a building block enabling capability for the maintenance of the model deployed to a large population of remotely-connected devices including, but not limited to: client registration and ML model lifecycle tracking (e.g., clients can be registered with the federated learning service 120 and have their capabilities and availability advertised); ML model update coordination (e.g., a matrix (or table, etc.) of model versions for supported builds of client logic may be maintained and allows for "at will" upgrading); edge device characteristics (e.g., power supply, processor type, latency, storage, location—address, operating system, current state, SDK, etc.); and pooling support (e.g., a subscription-based model for devices to voluntarily sign up for various tasks that they are capable of executing according to the specification of the software running on client side). ML model lifecycle information includes, but is not limited to one or more of: a version identifier of a deployed ML model, characteristics of the model (such as what instruction set architecture is used), etc. The remote deployment service (or module) 122 utilizes edge device characteristics and the matrix to determine which edge devices should be updated (e.g., which have outdated models and are in a position to be updated).

The remote deployment service 122 communicates with a user sign-in service 112 that provides information about users that may communicate with the edge devices. As such, ML models are deployed for properly authenticated users.

A remote training service (or module) 124 provides for an ability to train a given model using edge devices and/or fleets. Note that when edge devices are discussed, in many cases fleet usage can be substituted. In some embodiments, the fleets approximate the edge device characteristics, whereas in other embodiments, the fleets have different characteristics (e.g., more powerful). In some embodiments, the remote training service (or module) 124 may utilize a data storage 114 of the provider network to host training and/or validation data that are to be used to train one or more models stored in model storage 116. In some embodiments, the remote training service (or module) 124 utilizes data stored on the edge devices themselves (and therefore is not exposed to the provider network in any fashion) for training and/or validation. In some embodiments, a combination of data storage is used. The model storage 116 may store initial ML models (to be trained), intermediate models that are not production ready, production models to be deployed, and information about the models (e.g., version number, creation/modification date, creator identifier, etc.).

A provider network 100 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 106 (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) may be part of, or serve as a front-end to, a control plane of the provider network 100 that includes "backend" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as an availability domain, or simply a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Customers can connect to AZ of the cloud provider network via a publicly accessible network (e.g., the Internet, a cellular communication network), e.g., by way of a transit center (TC). TCs are the primary backbone locations linking customers to the cloud provider network and may be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence (or "POPs") outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

For example, in various embodiments, a "serverless" function may include code provided by a user or other entity—such as the provider network itself—that can be executed on demand. Serverless functions may be maintained within provider network 100 by an on-demand code execution service and may be associated with a particular user or account or be generally accessible to multiple users/accounts. A serverless function may be associated with a Uniform Resource Locator (URL), Uniform Resource Identifier (URI), or other reference, which may be used to invoke the serverless function. A serverless function may be executed by a compute resource, such as a virtual machine, container, etc., when triggered or invoked. In some embodiments, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some embodiments, these resources may be maintained in a "ready" state (e.g., having a pre-initialized runtime environment configured to execute the serverless functions), allowing the serverless functions to be executed in near real-time.

Circles with number in them indicate an exemplary flow of operations. At circle 1, a requesting edge device 140 requests that a ML model be trained using federated learning and subsequently deployed. The request may include one or more of: an identifier of an initial model (e.g., a path to a model), an initial model, an identifier of one or more training clients (e.g., a list of training clients), a location of training data (e.g., where on an edge device the training data is, a location withing the provider network, a location outside of the provider network that is not an edge device, etc.), a training data distribution method identifier (e.g., a path to a distribution method, an identifier of a selection of a provided distribution method, etc.), parameters for a training job, parameters for a testing job, an identifier of one or more testing clients (e.g., a list of testing clients), etc.

Figure 2:
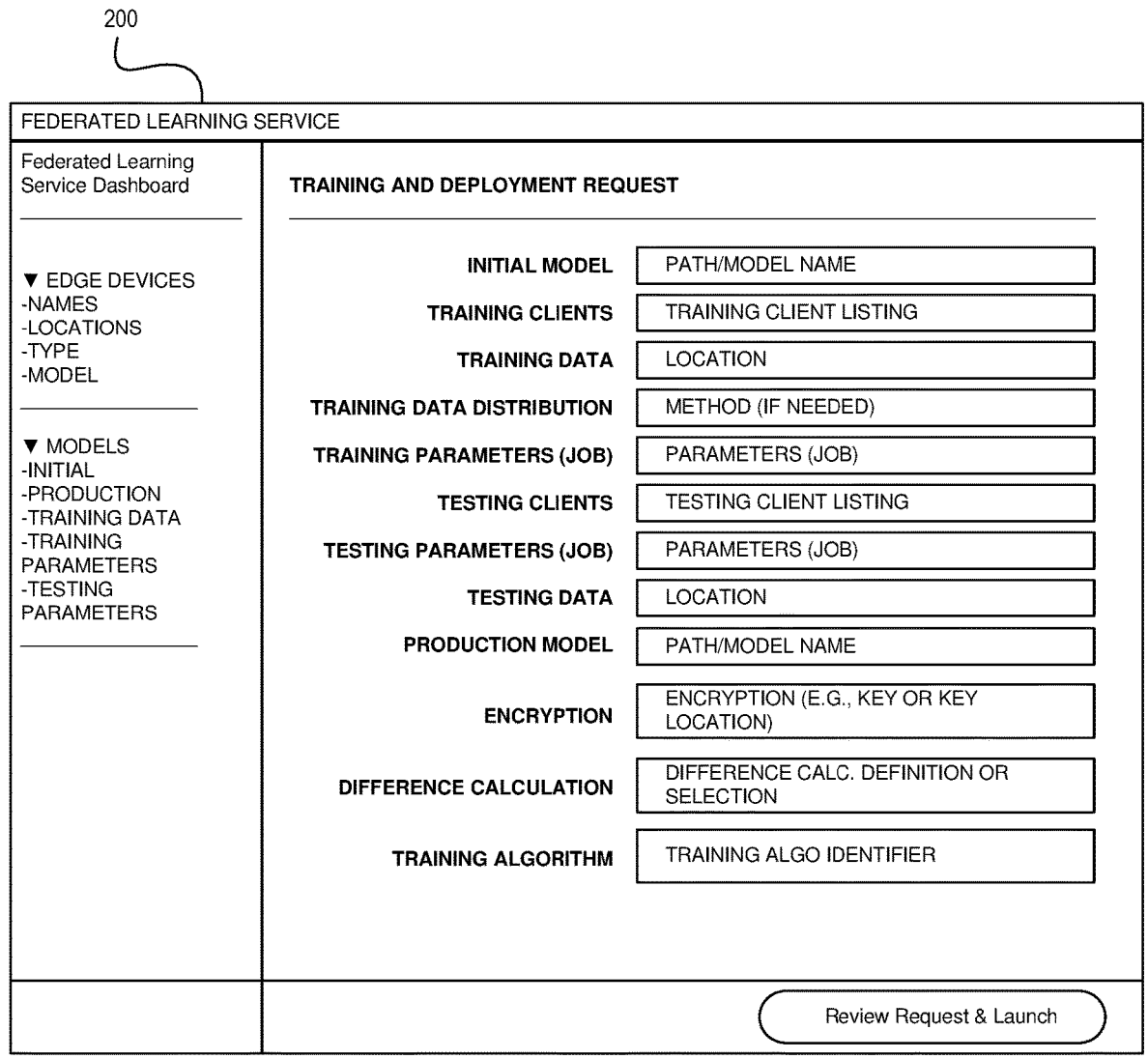
FIG. 2 illustrates embodiments of an exemplary training and deployment request.

FIG. 2 illustrates embodiments of an exemplary training and deployment request. Note that not all of the illustrated fields may be filled in for every type of request. For example, if there is a not a training data distribution method to be utilized (detailed in a later section), then that field may be left blank, or not included at all by the provider network. The request may include one or more of: an indication of an initial model (such as a path or model name); a listing of training clients; a location of training data (local, in the cloud, a combination); a data distribution method identifier; a job for training; a job for testing; a listing of testing clients; a location of testing data (local, in the cloud, a combination); locations of encryption keys, or the keys themselves, to be used for data exchange and/or content within training or testing device; an identification of a difference calculation; and/or a training algorithm identifier.

At circle 2, the remote training service (module) 124 is called to cause training of the ML model to be performed "remotely" from the model training and hosting service 110 to generate a production model. For example, edge devices 130(A)-(N) may be used to train the ML model using data local to those devices or data provided by the training service (module) 124. In other embodiments, fleets are used to train. These fleets are provisioned compute instances that have various instances types (e.g., different compute, memory, OS, etc.). The fleets could be a part of the provider network 100 (though not necessarily in the same physical location) and/or a part of a different provider's network and/or a part of the client's physical servers. Details of the training are discussed later. Note that the training may include testing by the one or more edge devices or fleets of the trained model.

The production model is called at circle 3 to begin deployment of the trained ML model. The remote deployment service (module) 122 utilizes information about the edge devices 130(A)-(N) to determine what version of the ML model they currently have (if any), if the edge devices 130(A)-(N) can handle the ML model (OS, ISA support, processor support, memory availability, etc.), priority of updating a particular edge device (e.g., the most out-of-date are updated first, etc.), etc.

At circle 4, the ML model is deployed to one or more of the edge devices.

Figure 3:
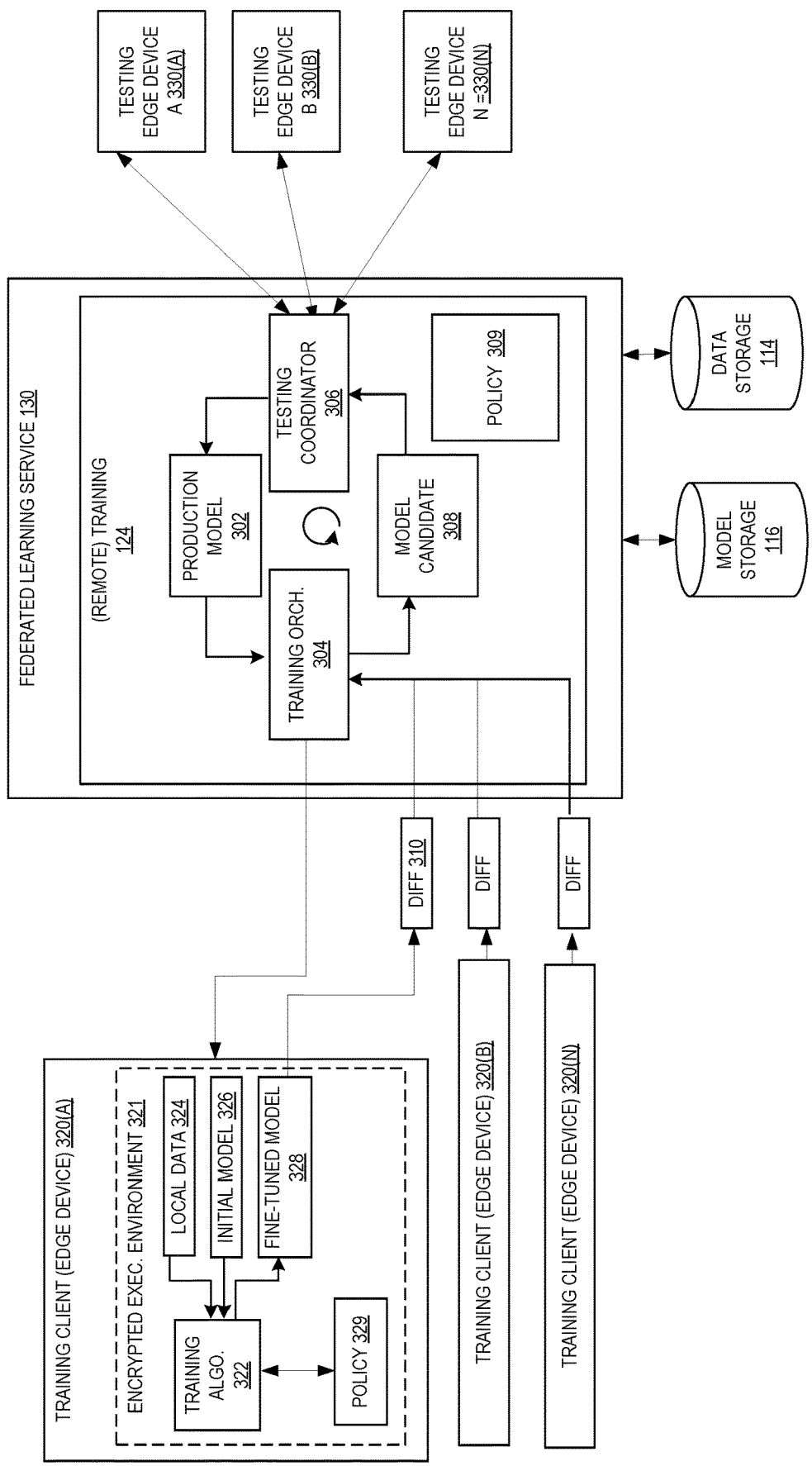
FIG. 3 illustrates embodiments of systems that support a federated learning service.

FIG. 3 illustrates embodiments of systems that support a federated learning service. In particular, this illustration shows aspects of distributed training at an edge device 320(A)-(N) using data that is local to each edge device. Additionally, one or edge devices 330(A)-(N) serve as testing devices. Note that the edge devices for training and testing may be the same devices. Distributed training aims at solving cases where training the model on the entire dataset does not seem practical because of data size and/or model training itself is parallelizable across multiple machines. In some embodiments, the local data of the edge devices 320(A)-(N) addresses different aspects of the model to be generated. For example, a first edge device may use local data that is specific for finding cats, a second edge device may use local data that is specific for finding dogs, etc. that are for a larger animal classifier. Different local data may address different layers of the model.

As noted above, the remote training service (or module) 124 provides for an ability to train a given model using edge devices and/or fleets. In this example, edge devices are used. Within, or available to, the remote training service (or module) 124 are a production model 302 (the model to be deployed), a training orchestrator 304 that coordinates training of a "fine-tuned" model from an common initial model by one or more training clients (edge devices) 320(A)-(N), a model candidate 308 that incorporates differences from the fine-tuned models with respect to the initial model, and a testing coordinator 306 to coordinate testing of the model candidate 308 using one or more edge devices (or fleets), wherein in an acceptable model candidate 308 (after testing) becomes the production model 302. In some embodiments, these components may be a part of an encrypted execution environment 321. As such, the remote training service 124 does not have access (without a key). Note that the production model 302, model candidate 308, and/or the initial model may be stored in model storage 116. Information about the edge devices, etc. may be stored in data storage 114.

In this illustration, only one training client (edge device) 320(A) is illustrated in detail. As shown, a training algorithm 322 trains an initial model 326 using the local training data 324. The local training data 324 is supplied by the ML model training requester, but is not stored by the provider network 100 and/or accessible to the provider network 100. There are some instances were training data 324 cannot be stored by the provider network 100 (e.g., government classified data, etc.) and other instances where a requester may, for whatever reason, not want its data available to the provider network 100. For example, the data may be regional data that cannot be transferred to the centralized location for training, or data that is physically/logically isolated and does not allow/ provide human access (e.g., a tight security perimeter, lights off operation, etc.).

The initial model 326 may be a model (or algorithm) that the requester (or someone on the requester's behalf) developed, a model (or algorithm) provided by the provider network 100 developed by an employee of the provider network 100, a model (or algorithm) provided by the provider network 100 developed by a third party, etc.

The training algorithm 322 may be of any type including supervised, semi-supervised, unsupervised, reinforcement, etc. The result of the training is a "fine-tuned" model 328 that is "fine-tuned" with respect to the initial model (for example, one or more of the weights may be different). The differences 310 between each "fine-tuned" model 328 and initial model 326 are either provided by each training client (edge device) 320(A)-(N) are either provided by each training client (edge device) 320(A)-(N) or computed by the remote training service (module) 124. In some embodiments, the differences 310 are encrypted and the key, etc. is provided via the initial request, etc. Note that the local data of each training client (edge device) 320(A)-(N) may not be identical, but in some embodiments is. Additionally, note that the training clients (edge devices) 320(A)-(N) do not need to be the same with respect to capabilities. That is some may use different processors, etc. which may result in different results. In some embodiments, the training clients (edge devices) 320(A)-(N) are generally reflective of the devices for which the production model 302 will be deployed.

When the differences are known, the training orchestrator 304 aggregates the differences and applies them to the initial model to generate a model candidate 308. The aggregation may be an average, a mean, a weighted average, a weighted mean, etc.

The testing coordinator 306 then coordinates the testing this model candidate 308 using one or more testing devices shown here was testing edge devices 330(A)-(N). The testing data may come from data storage 114 and is typically provided by the requester. Note, that in some embodiments, the testing devices also use local data that has not been shared with the provider network 100 (such as some scientific and/or enterprise collaboration initiatives, where data sharing is not desirable or even possible). The evaluation of the testing may take many forms including the use of classification or regression loss functions. Typically, the testing data is the same across testing edge devices 330(A)-(N), but, in some embodiments, does not need to be.

As such, the remote training service (module) 124 takes on the responsibility of coordinating training campaigns thus allowing developers to focus on other problems. It is designed in algorithm and data-agnostic manner allowing engineers to customize numerous policies obscuring the behavior of the system (e.g., client-selection, model and data differentiation, candidate evaluation). The remote training service (module) 124 handles coordination with remote devices (or fleets) and, in some embodiments, is designed to be fault-tolerant and available (e.g., handles disconnects, client software and model version coordination). For example, if one of the testing or training devices does not respond, the remote training service (module) 124 can choose to move on without input from the non-responsive devices, cause a retry, etc.

Figure 4:
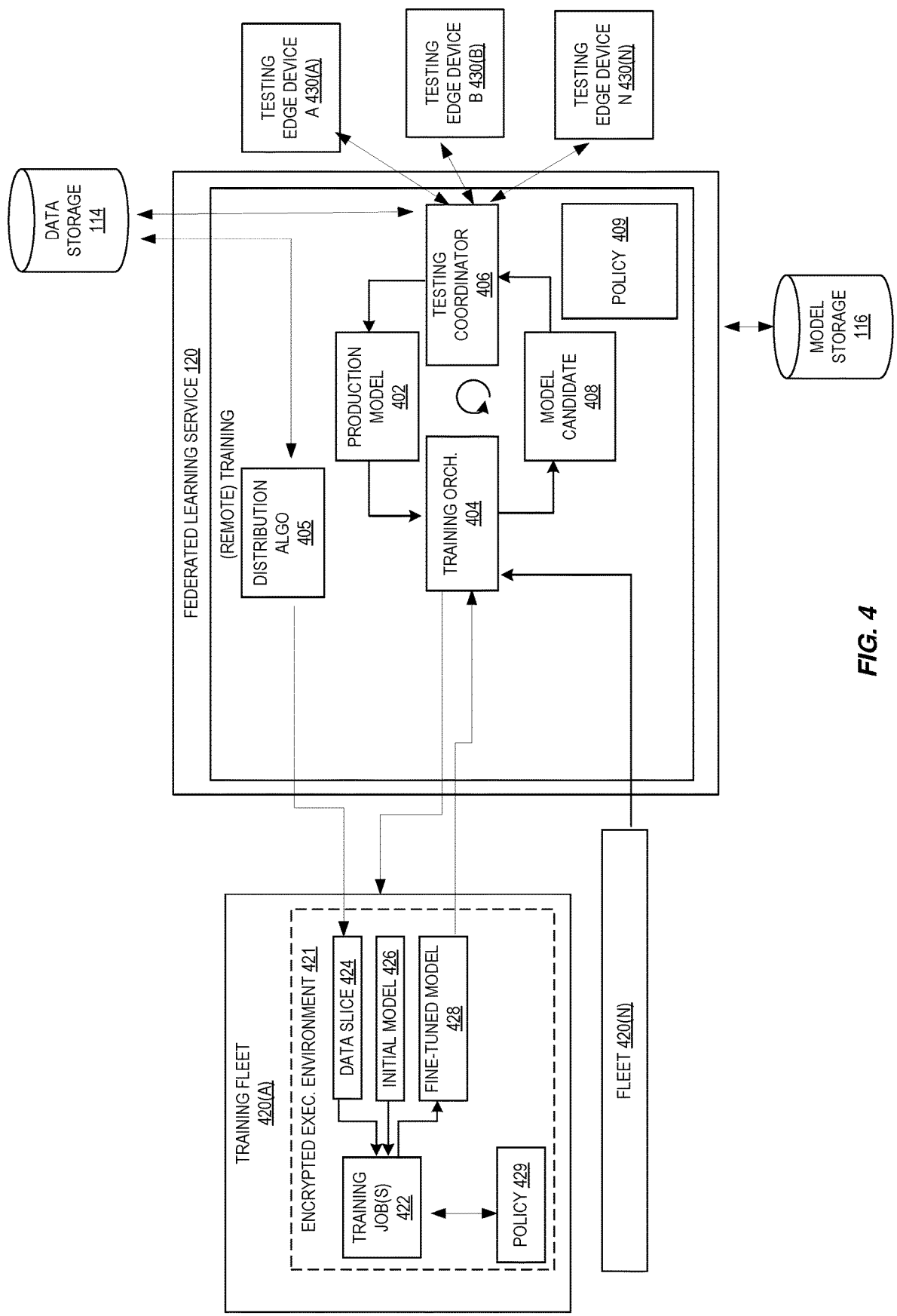
FIG. 4 illustrates embodiments of systems that support a federated learning service.

FIG. 4 illustrates embodiments of systems that support a federated learning service. In particular, this illustration shows aspects of distributed training at a training fleet 420(A)-(N) using data that is distributed. Additionally, one or edge devices 430(A)-(N) serve as testing devices. Note that the edge devices for testing may be a part of the training fleets.

As noted above, the remote training service (or module) 124 provides for an ability to train a given model using edge devices and/or fleets. In this example, fleets are used. Within, or available to, the remote training service (or module) 124 are a production model 402 (the model to be deployed), a training orchestrator 404 that coordinates training of a "fine-tuned" model from an common initial model by one or more training fleets 420(A)-(N), a model candidate 408 that incorporates differences from the fine-tuned models with respect to the initial model, and a testing coordinator 406 to coordinate testing of the model candidate 408 using one or more edge devices (or fleets), wherein in an acceptable model candidate 408 (after testing) becomes the production model 402. Note that the production model 402, model candidate 408, and/or the initial model may be stored in model storage 116. Information about the edge devices, fleets, etc. may be stored in data storage 114.

In this illustration, only one training fleet 420(A) is illustrated in detail. As shown, a training algorithm 422 trains an initial model 426 using a data slice 424. The data slice 424 is supplied by the ML model training requester using a distribution algorithm 405. The initial model 426 may be a model (or algorithm) that the requester (or someone on the requester's behalf) developed, a model (or algorithm) provided by the provider network 100 developed by an employee of the provider network 100, a model (or algorithm) provided by the provider network 100 developed by a third party, etc. In some embodiments, these components may be a part of an encrypted execution environment 321. As such, the remote training service 124 does not have access (without a key).

The training algorithm 422 may be of any type including supervised, semi-supervised, unsupervised, reinforcement, etc. The result of the training is a "fine-tuned" model 428 that is "fine-tuned" with respect to the initial model (for example, one or more of the weights may be different). The differences 410 between each "fine-tuned" model 428 and initial model 426 are either provided by each training fleet 420(A)-(N) are either provided by each training fleet 420(A)-(N) or computed by the remote training service (module) 124. Note that the data slice 424 of each fleet 420(A)-(N) may not be identical, but in some embodiments is. Additionally, note that the fleets 420(A)-(N) do not need to be the same with respect to capabilities. That is some may use different processors, etc. which may result in different results. In some embodiments, the training fleets 420(A)-(N) are generally reflective of the devices for which the production model 402 will be deployed.

In some embodiments, the training algorithm 422, etc. are under the control of a policy 429 which determines what actions are allowed under certain circumstances. For example, proper updates, etc. A policy 409 is used by the remote training service (or module) 124 weighs clients, reject clients, etc. to determine clients which are approved for being used for training and/or testing. As such, the policy 409 acts as a trust mechanism for the service.

When the differences are known, the training orchestrator 404 aggregates the differences and applies them to the initial model to generate a model candidate 408. The aggregation may be an average, a mean, a weighted average, a weighted mean, etc.

The testing coordinator 406 then coordinates the testing this model candidate 408 using one or more testing devices shown here was testing edge devices 430(A)-(N). The testing data may come from data storage 114 and is typically provided by the requester and may also be subject to a distribution algorithm. The evaluation of the testing may take many forms including the use of classification or regression loss functions. Typically, the testing data is the same across testing edge devices 430(A)-(N), but, in some embodiments, does not need to be.

As such, the remote training service (module) 124 takes on the responsibility of coordinating training campaigns thus allowing developers to focus on other problems. It is designed in algorithm and data-agnostic manner allowing engineers to customize numerous policies obscuring the behavior of the system (e.g., client-selection, model and data differentiation, candidate evaluation). The remote training service (module) 124 handles coordination with remote fleets (or devices) and, in some embodiments, is designed to be fault-tolerant and available (e.g., handles disconnects, client software and model version coordination). For example, if one of the testing or training fleets does not respond, the remote training service (module) 124 can choose to move on without input from the non-responsive fleets, cause a retry, etc.

Figure 5:
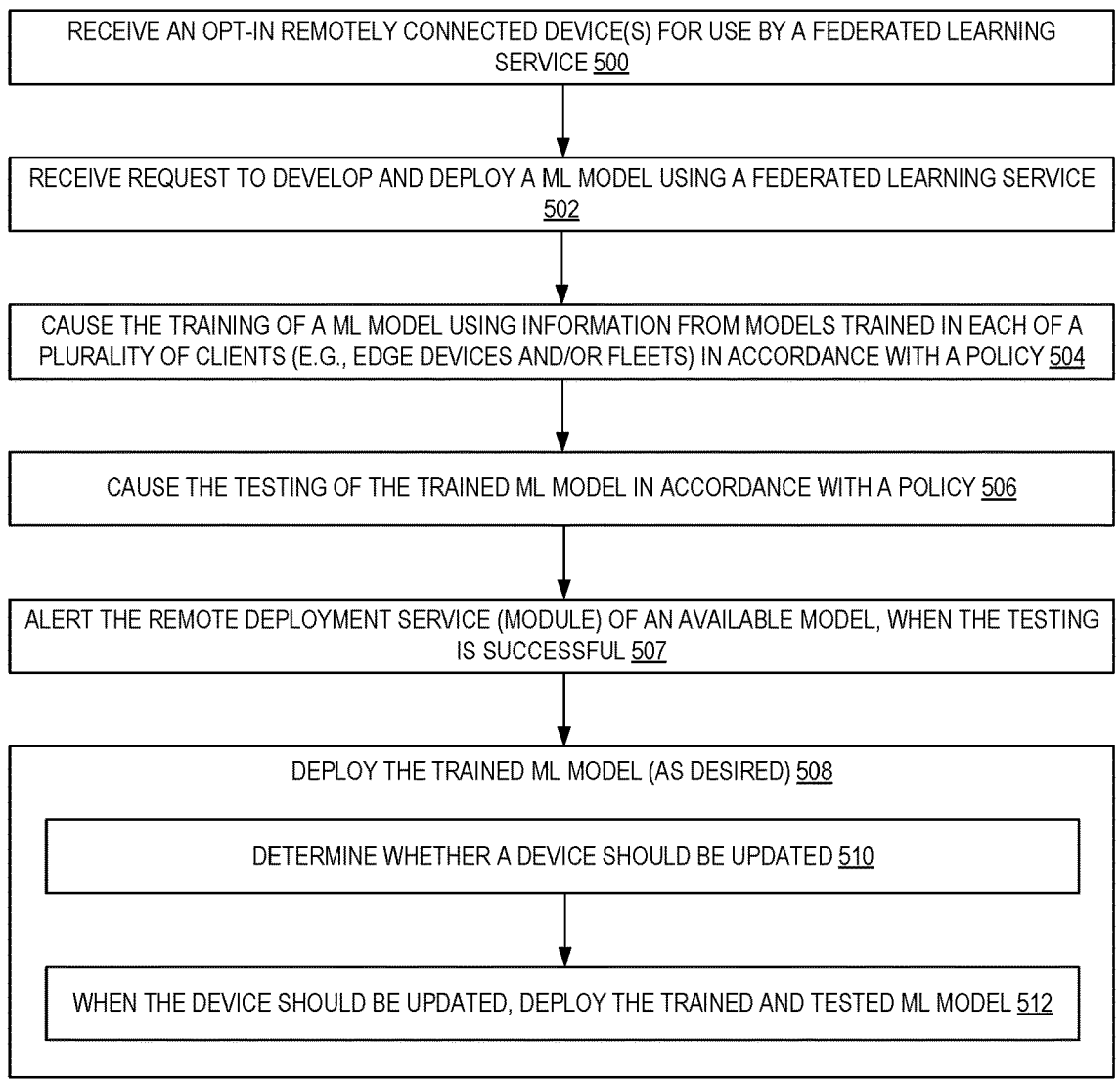
FIG. 5 is a flow diagram illustrating operations of a method for training and deploying a ML model using federated learning according to some embodiments.

FIG. 5 is a flow diagram illustrating operations of a method for training and deploying a ML model using federated learning according to some embodiments. Some or all of the operations (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations are performed by the federated learning service of the other figures.

At 500, an opt-in of remotely connected device(s) for use by a federated learning service is received. Those remotely connected device(s) include the capability (e.g., libraries, etc.) to run a federated learning service.

At 502, a request to develop and deploy a ML model using a federated learning service is received. As noted above, the request may include information such as an identifier an initial model, identifiers of training clients, a location of training data (e.g., locally stored on the training clients or accessible to the federated learning service to distribute), etc.

A ML model is caused to be trained using information from models trained by a plurality of clients (e.g., edge devices and/or fleets) in accordance with a policy at 504. For example, the training orchestrator 304/404 of the remote training service (module) 124 causes one or more edge devices or fleets to each train a fine-tuned model from an initial model. As noted, the training data may be local to the testing devices or distributed. The differences between the fine-tuned models and the initial models are applied to the initial model to generate a candidate model. It is this candidate model that is effectively caused to be trained.

The trained ML model is caused to be tested in accordance with a policy at 506. For example, the testing orchestrator 306/406 of the remote training service (module) 124 causes one or more edge devices or fleets to each test the candidate model. As noted, the testing data may be local to the testing devices or distributed.

Upon a successful test (that is the trained ML model is acceptable), the remote deployment service (module) is alerted of an available production model at 507. The production model may also be stored for retrieval along with version information, etc.

In some embodiments, the trained (and tested) ML model is deployed at 508. In some embodiments, the deployment consists of multiple acts. For example, a determination by the remote deployment service (module) of whether a device should be updated may be made at 510. This determination may take into account several factors including device performance characteristics, device availability, network availability, device status, current ML model deployed, etc. When the device should be updated, then the trained and tested ML model is deployed at 512.

Figure 6:
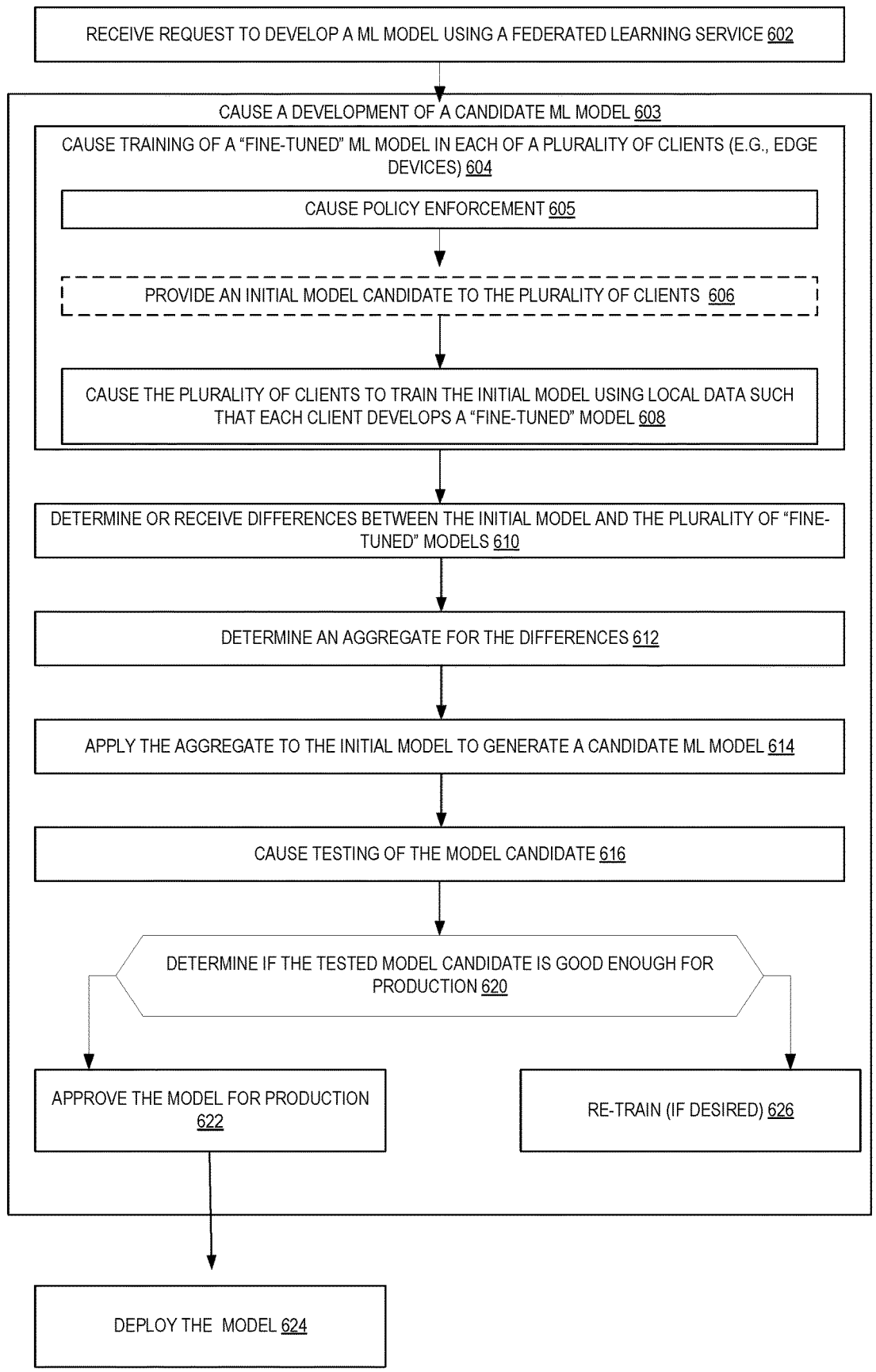
FIG. 6 is a flow diagram illustrating operations of a method for training and deploying a ML model using federated learning according to some embodiments.

FIG. 6 is a flow diagram illustrating operations of a method for training and deploying a ML model using federated learning according to some embodiments. Some or all of the operations (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations are performed by the federated learning service of the other figures.

At 602, a request to develop and deploy a ML model using a federated learning service is received. As noted above, the request may include information such as an identifier an initial model, identifiers of training clients, a location of training data (e.g., locally stored on the training clients or accessible to the federated learning service to distribute), etc.

At 603, the development of a candidate ML model is caused to occur. This development may include several acts. At 604, the training of a "fine-tuned" ML model in each of a plurality of clients (e.g., edge devices) is caused to occur. For example, the training orchestrator 304/404 of the remote training service (module) 124 causes one or more edge devices or fleets to each train a fine-tuned model from an initial model. At 605, one or more policies are caused to be enforced. Policies may be enforced on the client and/or as a part of the service. The initial model candidate is provided to the plurality of clients in some embodiments at 606. Then each of the plurality clients is caused to train the initial model using local data such that each client develops a "fine-tuned" model at 608. In some embodiments, the data in different clients addresses different aspects of the model.

At 610, the differences between the initial model and the plurality of "fine-tuned" models are determined or received. In some embodiments, the training clients determine the differences. In other embodiments, the training orchestrator 304/404 of the remote training service (module) 124 determines the differences.

An aggregate (e.g., a mean, median, etc.) for the differences is determined at 612. The aggregate is applied to the initial model to generate a model candidate at 614. For example, the weights of the initial model are changed to reflect the aggregate for the differences.

The candidate model is caused to be tested at 616. For example, the testing orchestrator 306/406 of the remote training service (module) 124 causes one or more edge devices or fleets to each test the candidate model. As noted, the testing data may be local to the testing devices or distributed.

A determination if the tested model candidate is good enough for production is made at 620. For example, is the loss function within an acceptable range of values. When the tested model candidate is good enough for production, it is approved for production (and the deployment service (module) notified) at 624. It can be deployed at 624.

When the tested model candidate is not good enough for production, re-training may occur at 626 when desired.

Figure 7:
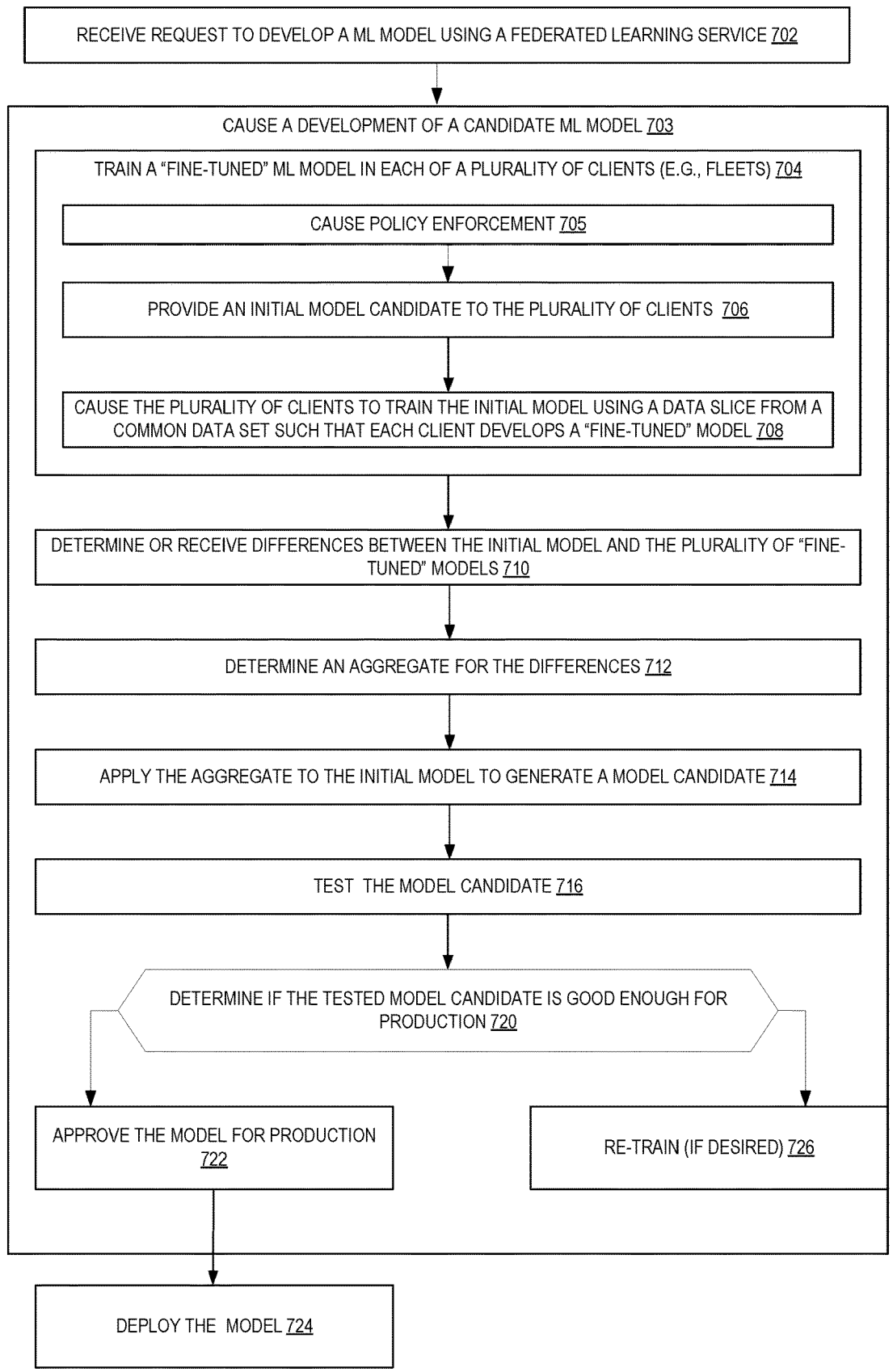
FIG. 7 is a flow diagram illustrating operations of a method for training and deploying a ML model using federated learning according to some embodiments.

FIG. 7 is a flow diagram illustrating operations of a method for training and deploying a ML model using federated learning according to some embodiments. Some or all of the operations (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations are performed by the federated learning service of the other figures.

At 702, a request to develop and deploy a ML model using a federated learning service is received. As noted above, the request may include information such as an identifier an initial model, identifiers of training clients, a location of training data (e.g., locally stored on the training clients or accessible to the federated learning service to distribute), etc.

At 703, the development of a candidate ML model is caused to occur. At 704, the training of a "fine-tuned" ML model in each of a plurality of clients (e.g., edge devices) is caused to occur. For example, the training orchestrator 304/404 of the remote training service (module) 124 causes one or more edge devices or fleets to each train a fine-tuned model from an initial model. At 705, one or more policies are caused to be enforced. Policies may be enforced on the client and/or as a part of the service. The initial model candidate is provided to the plurality of clients in some embodiments at 706. Then each of the plurality clients is caused to train the initial model using distributed data such that each client develops a "fine-tuned" model at 708 from a slice of common data. In some embodiments, the data in different clients addresses different aspects of the model.

At 710, the differences between the initial model and the plurality of "fine-tuned" models are determined or received. In some embodiments, the training clients determine the differences. In other embodiments, the training orchestrator 304/404 of the remote training service (module) 124 determines the differences.

An aggregate (e.g., a mean, median, etc.) for the differences is determined at 712. The aggregate is applied to the initial model to generate a model candidate at 714. For example, the weights of the initial model are changed to reflect the aggregate for the differences.

The candidate model is caused to be tested at 716. For example, the testing orchestrator 306/406 of the remote training service (module) 124 causes one or more edge devices or fleets to each test the candidate model. As noted, the testing data may be local to the testing devices or distributed.

A determination if the tested model candidate is good enough for production is made at 720. For example, is the loss function within an acceptable range of values. When the tested model candidate is good enough for production, it is approved for production (and the deployment service (module) notified) at 724. It can be deployed at 724.

When the tested model candidate is not good enough for production, re-training may occur at 726 when desired.

Figure 8:
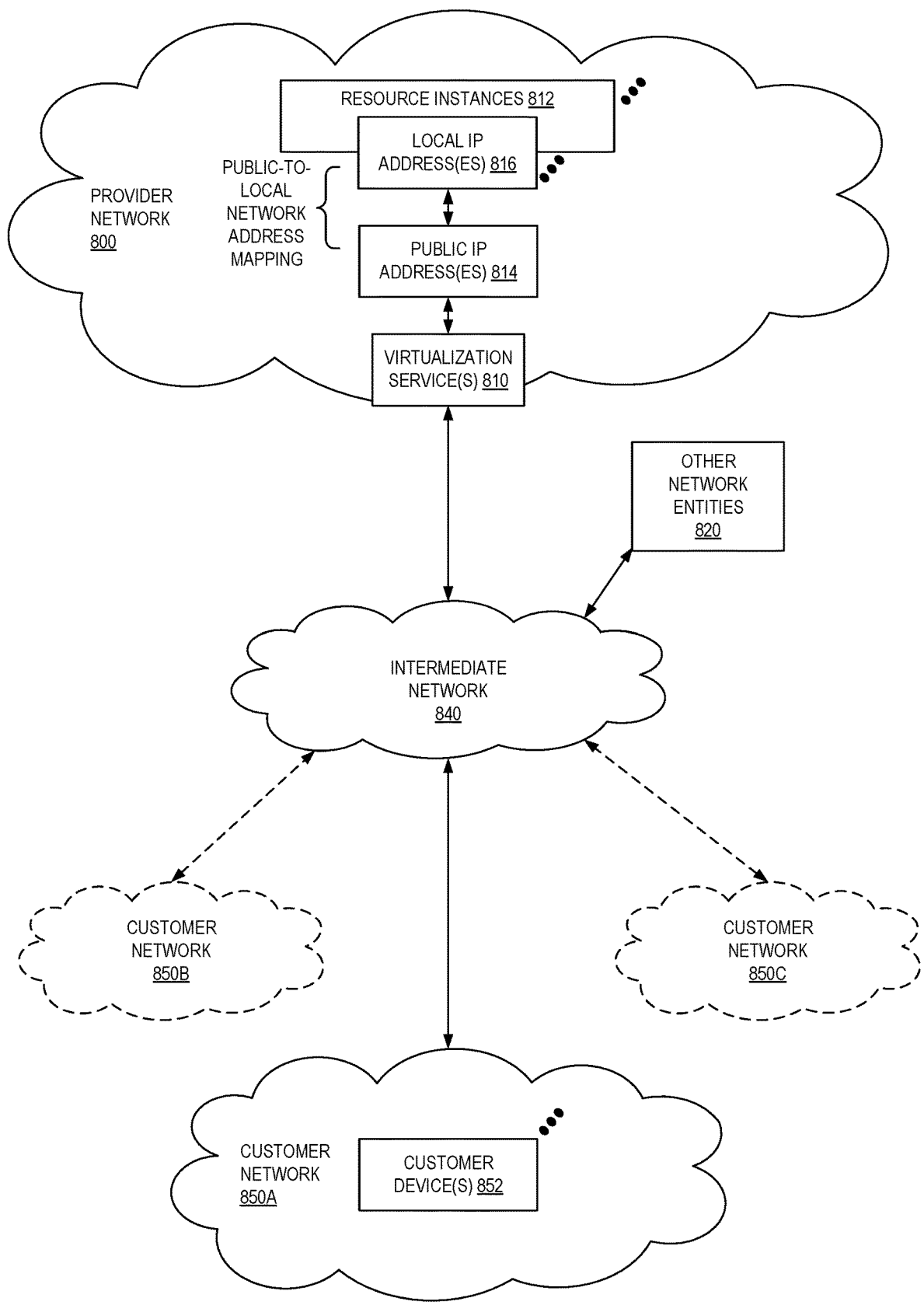
FIG. 8 illustrates an example provider network environment according to some embodiments.

FIG. 8 illustrates an example provider network (or "service provider system") environment according to some embodiments. A provider network 800 may provide resource virtualization to customers via one or more virtualization services 810 that allow customers to purchase, rent, or otherwise obtain instances 812 of virtualized resources, including but not limited to computation and storage resources, implemented on devices within the provider network or networks in one or more data centers. Local Internet Protocol (IP) addresses 816 may be associated with the resource instances 812; the local IP addresses are the internal network addresses of the resource instances 812 on the provider network 800. In some embodiments, the provider network 800 may also provide public IP addresses 814 and/or public IP address ranges (e.g., Internet Protocol version 4 (IPv4) or Internet Protocol version 6 (IPv6) addresses) that customers may obtain from the provider 800.

Conventionally, the provider network 800, via the virtualization services 810, may allow a customer of the service provider (e.g., a customer that operates one or more client networks 850A-850C including one or more customer device(s) 852) to dynamically associate at least some public IP addresses 814 assigned or allocated to the customer with particular resource instances 812 assigned to the customer. The provider network 800 may also allow the customer to remap a public IP address 814, previously mapped to one virtualized computing resource instance 812 allocated to the customer, to another virtualized computing resource instance 812 that is also allocated to the customer. Using the virtualized computing resource instances 812 and public IP addresses 814 provided by the service provider, a customer of the service provider such as the operator of customer network(s) 850A-850C may, for example, implement customer-specific applications and present the customer's applications on an intermediate network 840, such as the Internet. Other network entities 820 on the intermediate network 840 may then generate traffic to a destination public IP address 814 published by the customer network(s) 850A-850C; the traffic is routed to the service provider data center, and at the data center is routed, via a network substrate, to the local IP address 816 of the virtualized computing resource instance 812 currently mapped to the destination public IP address 814. Similarly, response traffic from the virtualized computing resource instance 812 may be routed via the network substrate back onto the intermediate network 840 to the source entity 820.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 800; a customer may then assign their allocated public IP addresses to particular resource instances allocated to the customer. These public IP addresses may be referred to as customer public IP addresses, or simply customer IP addresses. Instead of being assigned by the provider network 800 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 9:
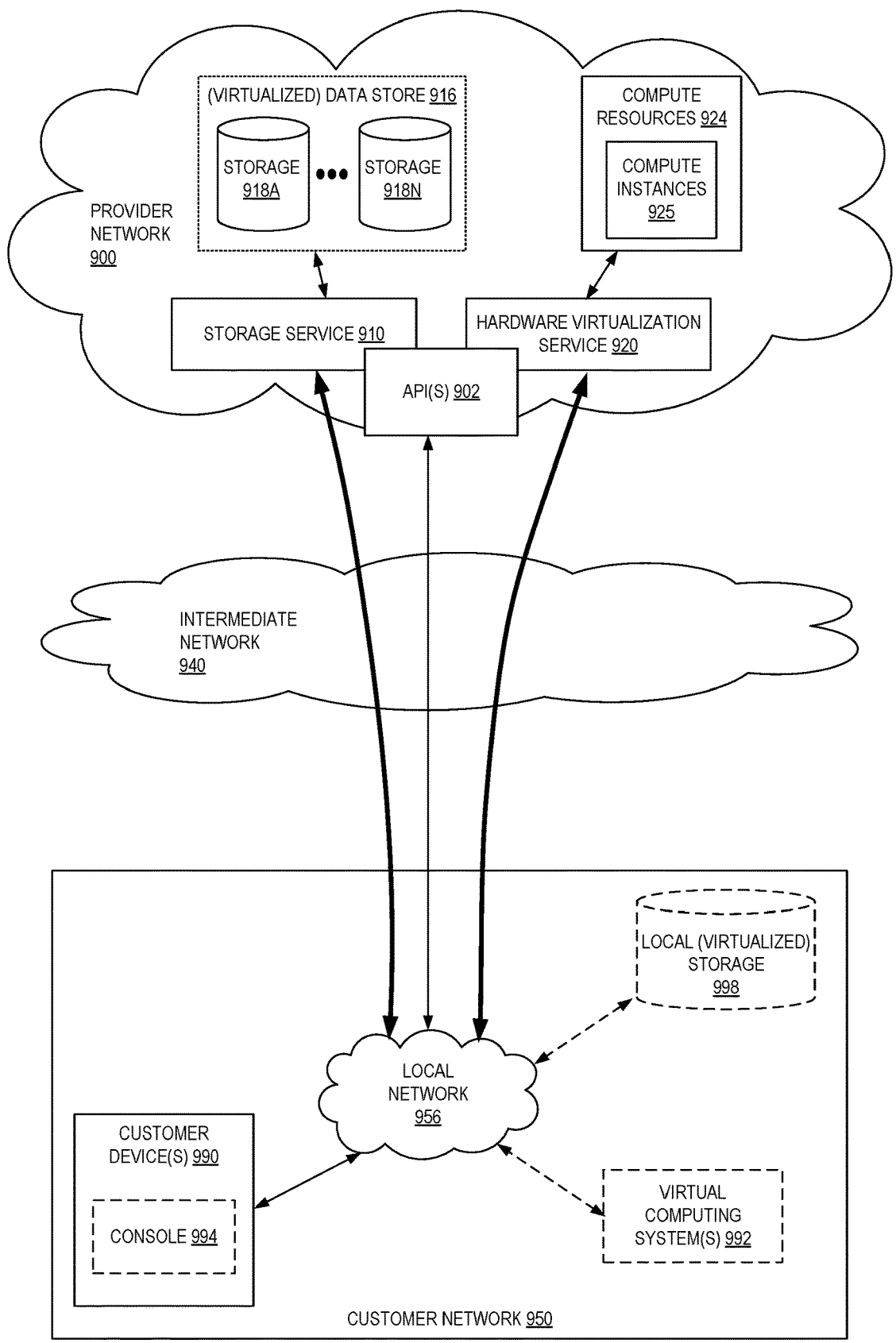
FIG. 9 is a block diagram of an example provider network that provides a storage service and a hardware virtualization service to customers according to some embodiments.

FIG. 9 is a block diagram of an example provider network that provides a storage service and a hardware virtualization service to customers, according to some embodiments. Hardware virtualization service 920 provides multiple compute resources 924 (e.g., compute instances 925 such as VMs) to customers. The compute resources 924 may, for example, be rented or leased to customers of the provider network 900 (e.g., to a customer that implements customer network 950). Each computation resource 924 may be provided with one or more local IP addresses. Provider network 900 may be configured to route packets from the local IP addresses of the compute resources 924 to public Internet destinations, and from public Internet sources to the local IP addresses of compute resources 924.

Provider network 900 may provide a customer network 950, for example coupled to intermediate network 940 via local network 956, the ability to implement virtual computing systems 992 via hardware virtualization service 920 coupled to intermediate network 940 and to provider network 900. In some embodiments, hardware virtualization service 920 may provide one or more APIs 902, for example a web services interface, via which a customer network 950 may access functionality provided by the hardware virtualization service 920, for example via a console 994 (e.g., a web-based application, standalone application, mobile application, etc.). In some embodiments, at the provider network 900, each virtual computing system 992 at customer network 950 may correspond to a computation resource 924 that is leased, rented, or otherwise provided to customer network 950.

From an instance of a virtual computing system 992 and/or another customer device 990 (e.g., via console 994), the customer may access the functionality of storage service 910, for example via one or more APIs 902, to access data from and store data to storage resources 918A-918N of a virtual data store 916 (e.g., a folder or "bucket", a virtualized volume, a database, etc.) provided by the provider network 900. In some embodiments, a virtualized data store gateway (not shown) may be provided at the customer network 950 that may locally cache at least some data, for example frequently-accessed or critical data, and that may communicate with storage service 910 via one or more communications channels to upload new or modified data from a local cache so that the primary store of data (virtualized data store 916) is maintained. In some embodiments, a user, via a virtual computing system 992 and/or on another customer device 990, may mount and access virtual data store 916 volumes via storage service 910 acting as a storage virtualization service, and these volumes may appear to the user as local (virtualized) storage 998.

While not shown in FIG. 9, the virtualization service(s) may also be accessed from resource instances within the provider network 900 via API(s) 902. For example, a customer, appliance service provider, or other entity may access a virtualization service from within a respective virtual network on the provider network 900 via an API 902 to request allocation of one or more resource instances within the virtual network or within another virtual network.

Illustrative Systems

Figure 10:
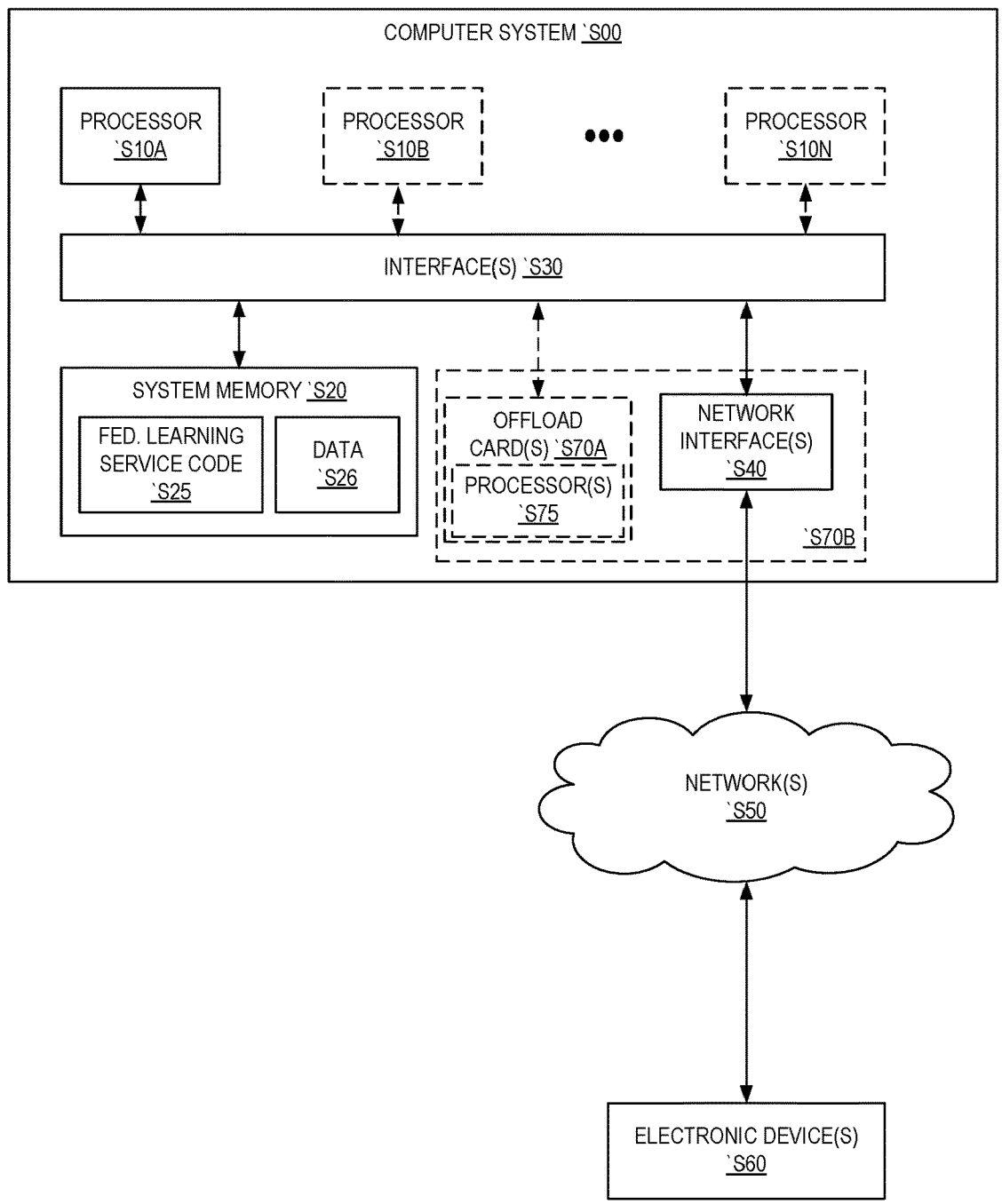
FIG. 10 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 1000 illustrated in FIG. 10. In the illustrated embodiment, computer system 1000 includes one or more processors 1010 coupled to a system memory 1020 via an input/output (I/O) interface 1030. Computer system 1000 further includes a network interface 1040 coupled to I/O interface 1030. While FIG. 10 shows computer system 1000 as a single computing device, in various embodiments a computer system 1000 may include one computing device or any number of computing devices configured to work together as a single computer system 1000.

In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1010 may commonly, but not necessarily, implement the same ISA.

System memory 1020 may store instructions and data accessible by processor(s) 1010. In various embodiments, system memory 1020 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1020 as federated learning service code 1025 (e.g., executable to implement, in whole or in part, the federated learning service 120) and data 1026.

In one embodiment, I/O interface 1030 may be configured to coordinate I/O traffic between processor 1010, system memory 1020, and any peripheral devices in the device, including network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices 1060 attached to a network or networks 1050, such as other computer systems or devices as illustrated in FIG. 1, for example. In various embodiments, network interface 1040 may support communication via any suitable wired or wireless general data networks, such as types of Ethernet network, for example. Additionally, network interface 1040 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1000 includes one or more offload cards 1070A or 1070B (including one or more processors 1075, and possibly including the one or more network interfaces 1040) that are connected using an I/O interface 1030 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 1000 may act as a host electronic device (e.g., operating as part of a hardware virtualization service) that hosts compute resources such as compute instances, and the one or more offload cards 1070A or 1070B execute a virtualization manager that can manage compute instances that execute on the host electronic device. As an example, in some embodiments the offload card(s) 1070A or 1070B can perform compute instance management operations such as pausing and/or un-pausing compute instances, launching and/or terminating compute instances, performing memory transfer/copying operations, etc. These management operations may, in some embodiments, be performed by the offload card(s) 1070A or 1070B in coordination with a hypervisor (e.g., upon a request from a hypervisor) that is executed by the other processors 1010A-1010N of the computer system 1000. However, in some embodiments the virtualization manager implemented by the offload card(s) 1070A or 1070B can accommodate requests from other entities (e.g., from compute instances themselves), and may not coordinate with (or service) any separate hypervisor.

In some embodiments, system memory 1020 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1000 via I/O interface 1030. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1000 as system memory 1020 or another type of memory. Further, a computer-accessible medium may include transmission media or signals such as electrical, electromagnetic, or digital signals, conveyed via a communication medium such as a network and/or a wireless link, such as may be implemented via network interface 1040.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   receiving a request to train and deploy a machine learning model using a federated learning service of a provider network;
   causing, by the federated learning service executing federated learning service code using one or more processors, development of a candidate machine learning model using at least two devices external to the provider network, the development of the candidate machine learning model including:
      causing a policy enforcement mechanism on the at least two devices external to the provider network to determine that the at least two devices external to the provider network are allowed to perform aspects of machine learning model training;
      providing an initial machine learning model to the at least two devices external to the provider network,
      causing, by a remote training service of the federated learning service, each of the at least two devices external to the provider network to locally train the initial machine learning model using training data to each generate a fine-tuned machine learning model,
      determining differences between the initial machine learning model and the fine-tuned machine learning models,
      aggregating the differences to generate aggregated differences, and
      applying, by the remote training service, the aggregated differences to the initial machine learning model to generate the candidate machine learning model;
   causing testing of the candidate machine learning model to determine the candidate machine learning model is to become a production machine learning model; and
   deploying the production machine learning model to at least one device.

2. The computer-implemented method of claim 1, wherein the request includes an indication of a distribution algorithm to use to provide the training data from the federated learning service to the at least two devices external to the provider network.

3. The computer-implemented method of claim 1, wherein the training data is local to the at least two devices external to the provider network and not accessible by the federated learning service.

4. A computer-implemented method comprising:
   receiving a request to train and deploy a machine learning model using a federated learning service of a provider network;
   causing, by the federated learning service executing federated learning service code using one or more processors, development of a deployable machine learning model using at least two devices external to the provider network, the development of the deployable machine learning model including:
      causing a policy enforcement mechanism on the at least two devices external to the provider network to determine that the at least two devices external to the provider network are allowed to perform aspects of machine learning model training;

providing an initial machine learning model to the at least two devices external to the provider network, causing, by a remote training service of the federated learning service, each of the at least two devices external to the provider network to locally train the initial machine learning model using training data to each generate a modified version of the initial machine learning model, determining differences between the initial machine learning model and the modified versions of the initial machine learning model, applying, by the remote training service, the differences to the initial machine learning model to generate a candidate machine learning model, and causing testing of the candidate machine learning model to determine the candidate machine learning model is the deployable machine learning model.

5. The computer-implemented method of claim 4, further comprising aggregating the differences to generate aggregated differences, wherein the differences applied to the initial machine learning model are the aggregated differences.

6. The computer-implemented method of claim 5, wherein the aggregating is one of a median or a mean.

7. The computer-implemented method of claim 4, wherein the training data is local to the at least two devices external to the provider network and not accessible by the federated learning service.

8. The computer-implemented method of claim 4, wherein the training data is a slice of a common set of training data provided by the federated learning service.

9. The computer-implemented method of claim 4, wherein a location of the testing data is provided by the request.

10. The computer-implemented method of claim 4, further comprising deploying the deployable machine learning model to at least one device using the federated learning service according to a request.

11. The computer-implemented method of claim 10, further comprising: prior to deploying the deployable machine learning model using the federated learning service according to a request, determining the at least one device is in a state that allows for deployment of the deployable machine learning model and any model on the at least one device is not the deployable machine learning model.

12. The computer-implemented method of claim 4, wherein the at least two devices external to the provider network are edge devices.

13. The computer-implemented method of claim 4, wherein the training data used by the at least two devices external to the provider network is not the same and addresses different aspects of the initial machine learning model.

14. The computer-implemented method of claim 4, wherein the request includes at least one field including a location of the initial machine learning model, a location of the training data, and a listing of the at least two devices external to the provider network used for training.

15. A system comprising:
a first two or more electronic devices external to a provider network to train aspects of a machine learning model under the coordination of a federated learning service of the provider network; and a second one or more electronic devices to implement the federated learning service in the provider network, the federated learning service including federated learning service code that upon execution by one or more processors causes the federated learning service to:

receive a request to train and deploy a machine learning model using the federated learning service in the provider network;

cause development of a deployable machine learning model using the first two or more electronic devices external to the provider network, the development of the deployable machine learning model including:

causing a policy enforcement mechanism on the first two or more electronic devices external to the provider network to determine that the first two or more electronic devices external to the provider network are allowed to perform aspects of machine learning model training;

providing an initial machine learning model to the first two or more electronic devices external to the provider network, causing, by a remote training service of the federated learning service, each of the first two or more electronic devices external to the provider network to locally train the initial machine learning model using training data to each generate a modified version of the initial machine learning model, determining differences between the initial machine learning model and the modified versions of the initial machine learning model, applying, by the remote training service, the differences to the initial machine learning model to generate the candidate machine learning model, and causing testing of the candidate machine learning model to determine the candidate machine learning model is the deployable machine learning model.

16. The system of claim 15, wherein the federated learning service is further to aggregate the differences to generate aggregated differences, wherein the differences applied to the initial machine learning model are the aggregated differences.

17. The system of claim 16, wherein the aggregating is one of a median or a mean.

18. The system of claim 15, wherein the training data is local to the first two or more electronic devices external to the provider network and not accessible by the federated learning service.

19. The system of claim 15, wherein the training data is a slice of a common set of training data provided by the federated learning service.

20. The system of claim 15, wherein the training data used by the first two or more electronic devices external to the provider network is not the same and addresses different aspects of the initial machine learning model.

* * * * *